No. 832,410. PATENTED OCT. 2, 1906.
T. A. & J. G. OVERBY.
CORN HARVESTER AND HUSKER.
APPLICATION FILED DEC. 7, 1904.
6 SHEETS—SHEET 1.
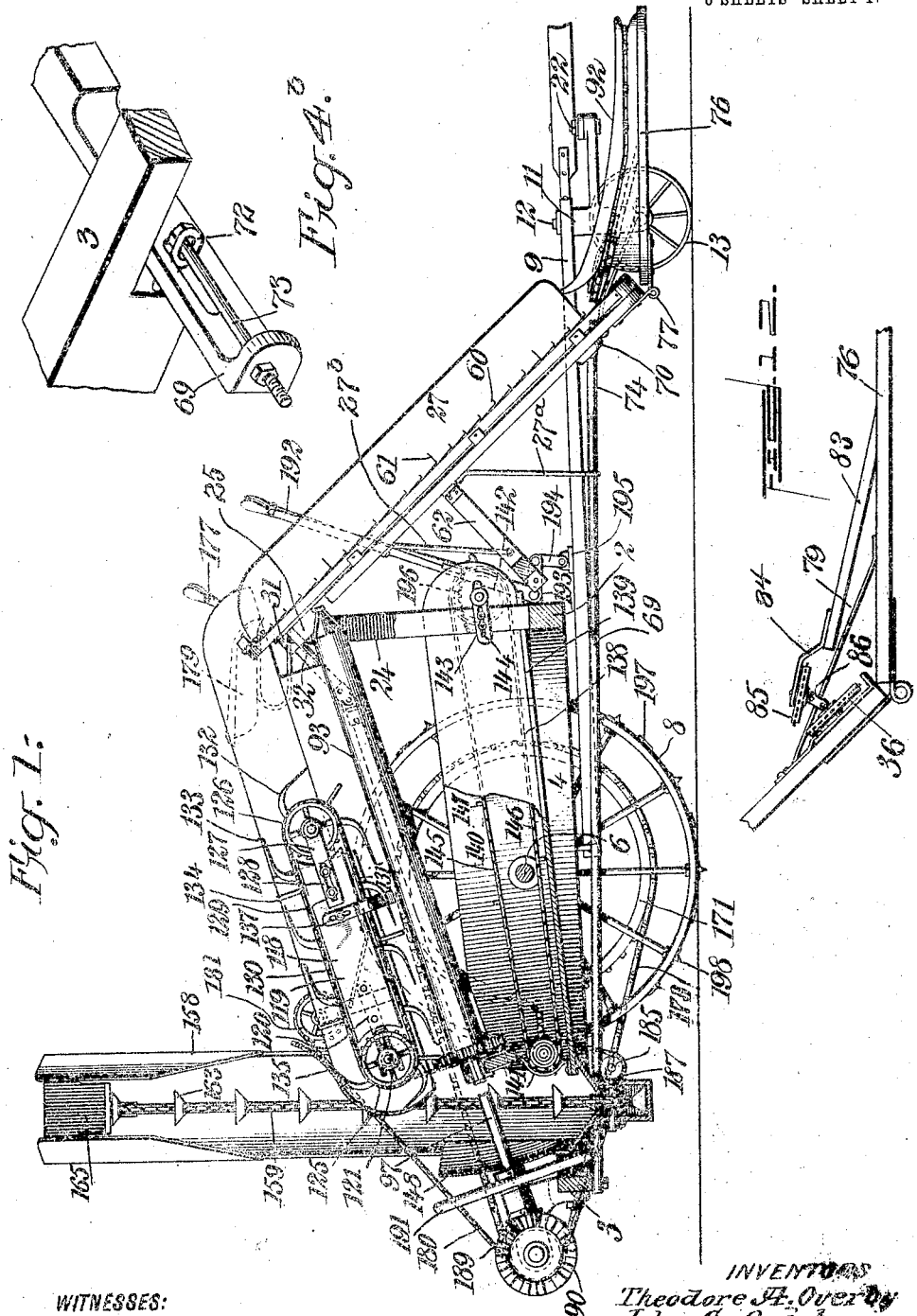
WITNESSES:
INVENTORS
Theodore A. Overby
John G. Overby
BY
ATTORNEYS

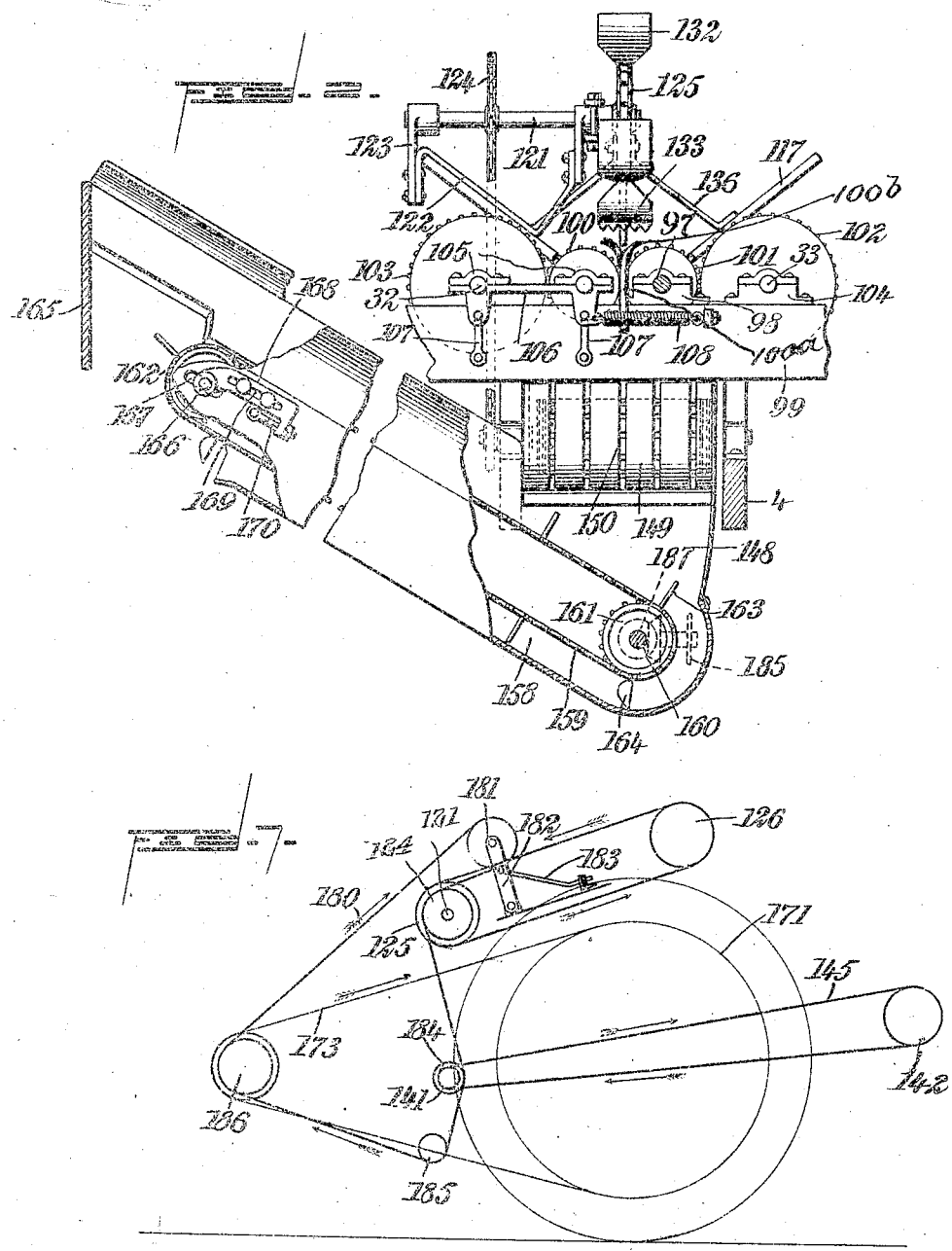

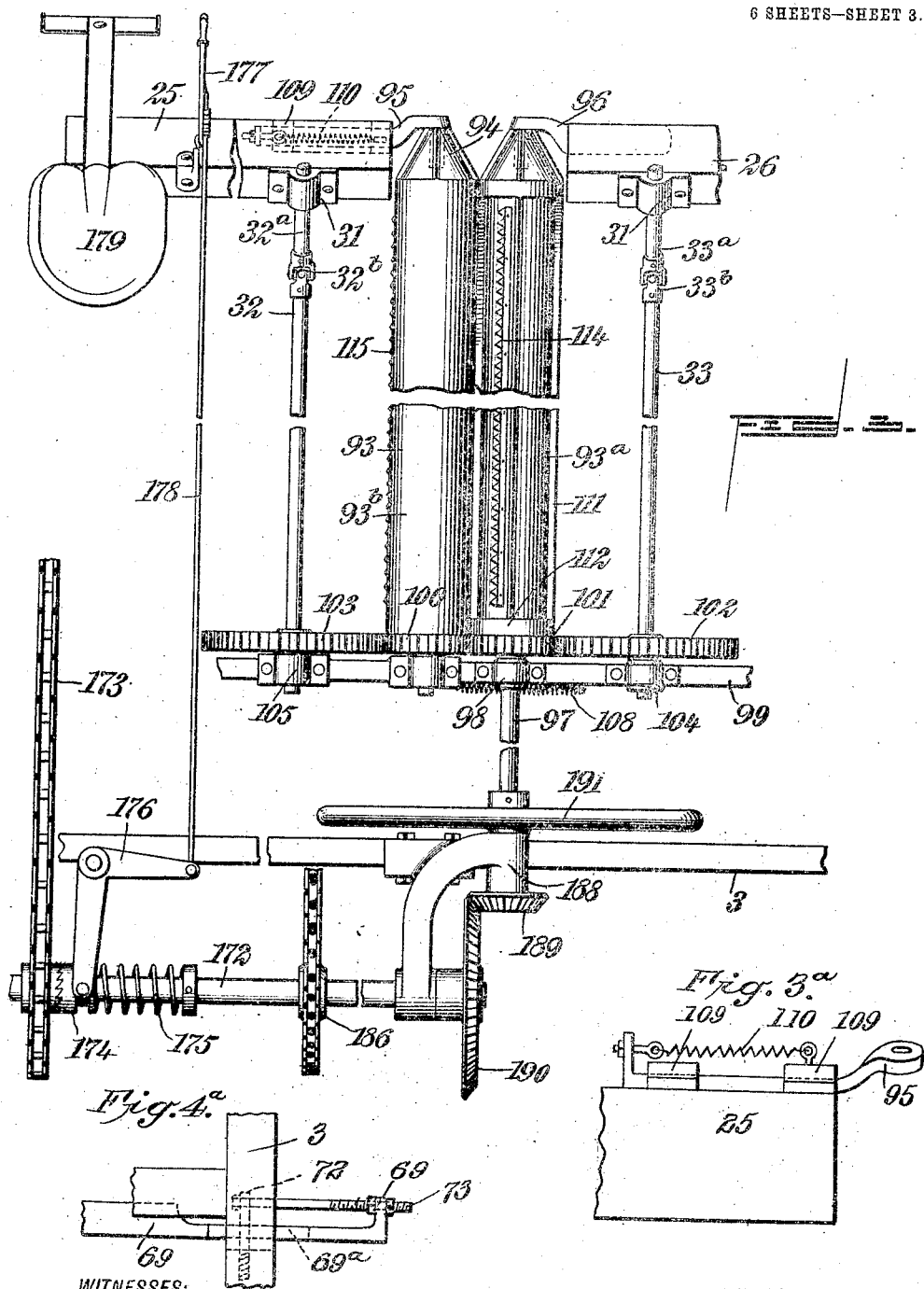
No. 832,410. PATENTED OCT. 2, 1906.
T. A. & J. G. OVERBY.
CORN HARVESTER AND HUSKER.
APPLICATION FILED DEC. 7, 1904.
6 SHEETS—SHEET 3.
INVENTORS
Theodore A. Overby
John G. Overby No. 832,410. PATENTED OCT. 2, 1906.
T. A. & J. G. OVERBY.
CORN HARVESTER AND HUSKER.
APPLICATION FILED DEC. 7, 1904.
6 SHEETS—SHEET 4.
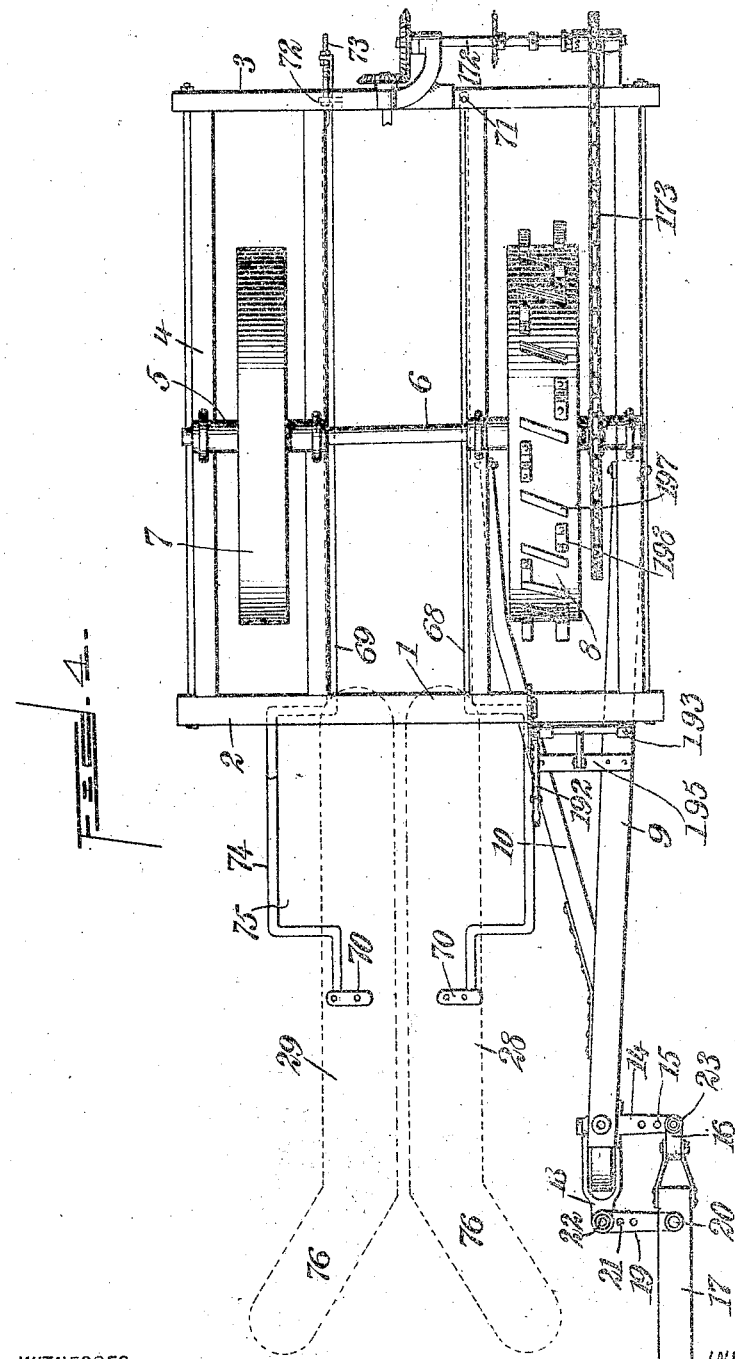
WITNESSES:
INVENTORS
Theodore A. Overby
John G. Overby
BY
ATTORNEYS

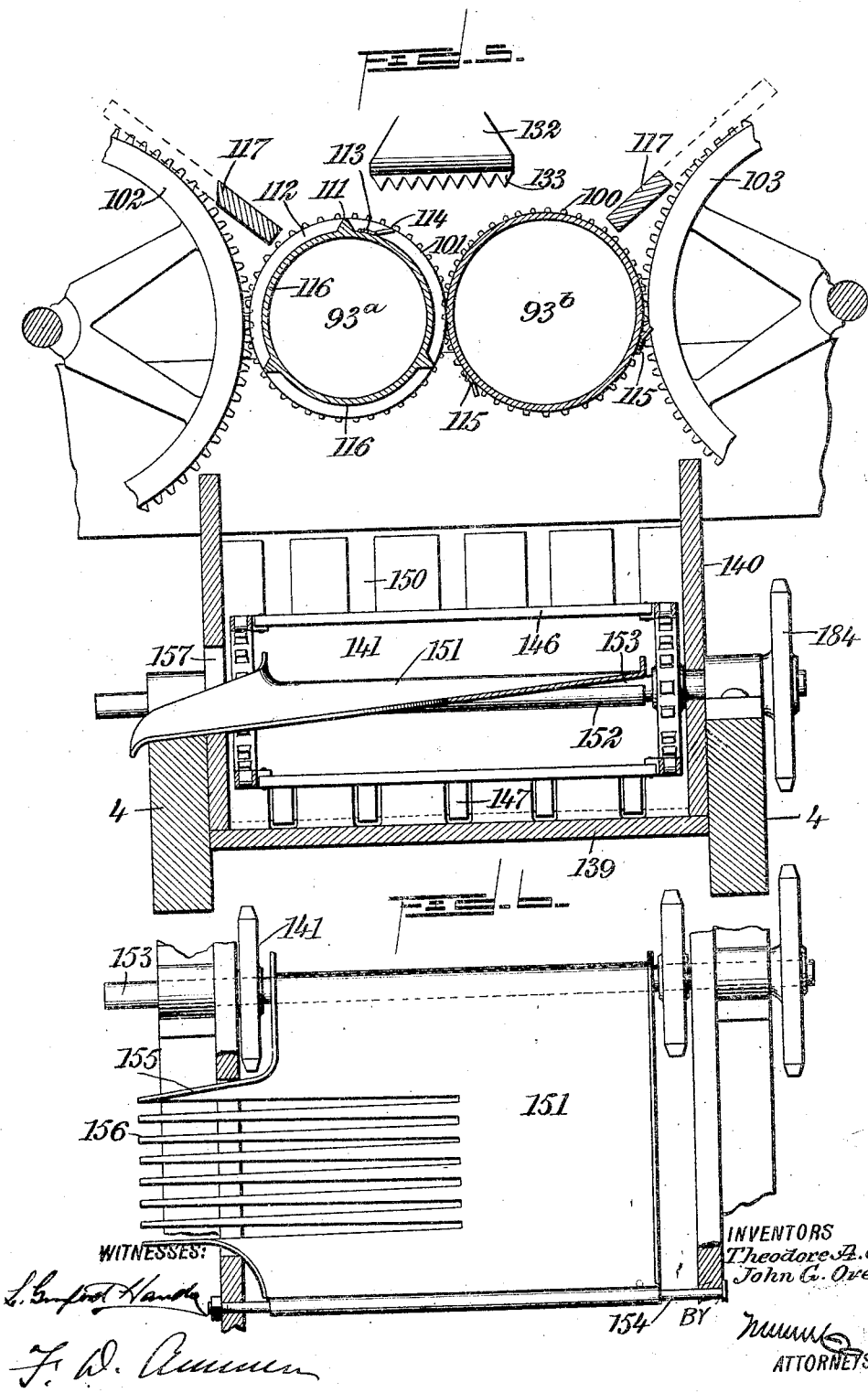

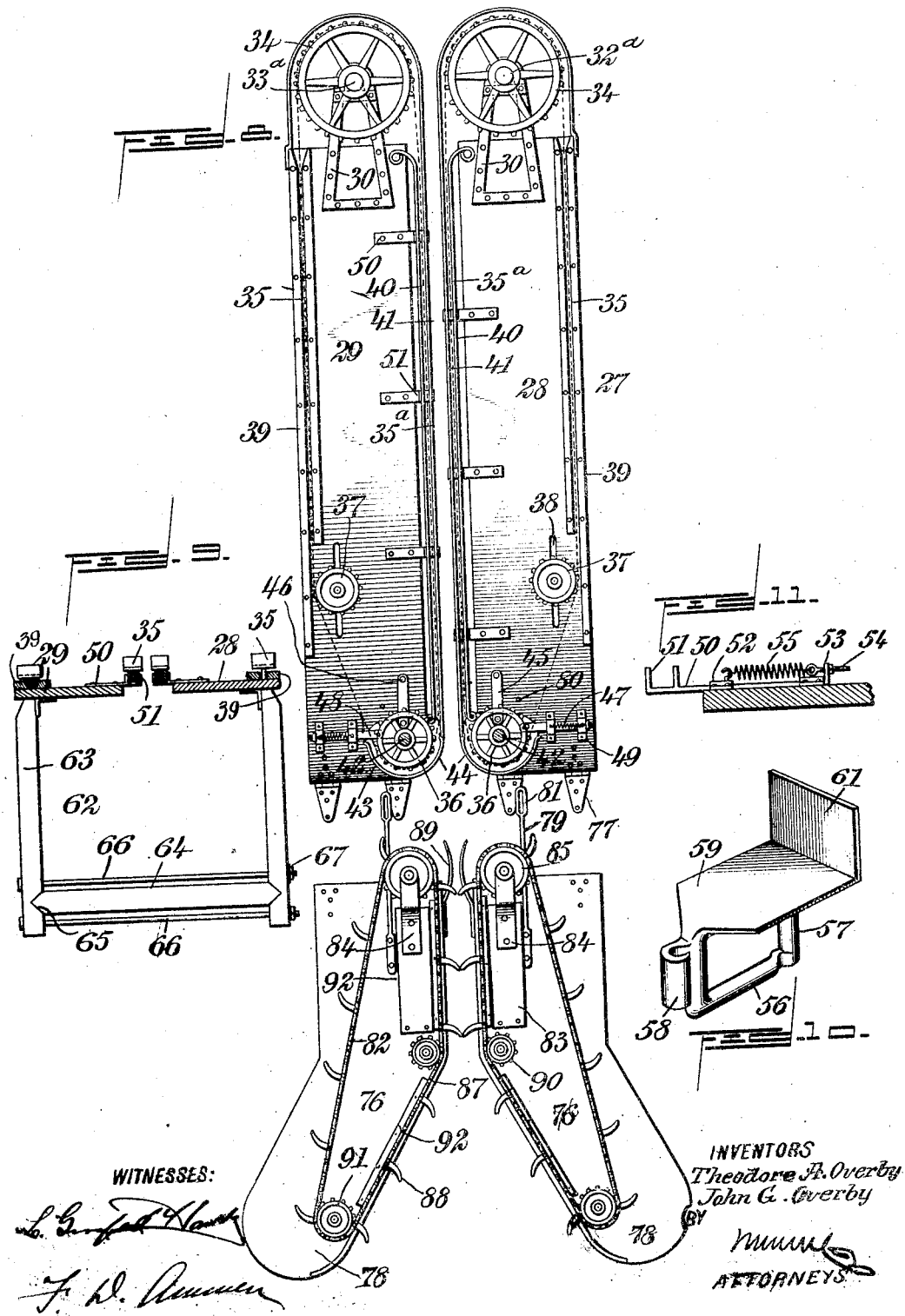

UNITED STATES PATENT OFFICE.

THEODORE A. OVERBY AND JOHN G. OVERBY, OF MELLETTE, SOUTH DAKOTA.

CORN HARVESTER AND HUSKER.

No. 832,410.　　　Specification of Letters Patent.　　Patented Oct. 2, 1906.

Application filed December 7, 1904. Serial No. 235,790.

*To all whom it may concern:*

Be it known that we, THEODORE A. OVERBY and JOHN G. OVERBY, citizens of the United States, and residents of Mellette, in the county of Spink and State of South Dakota, have invented a new and Improved Corn Harvester and Husker, of which the following is a full, clear, and exact description.

This invention relates to corn-harvesters, and especially to that class which are adapted to be advanced in the standing corn and which operate automatically to pull the ears and husk the same.

The object of the invention is to provide an implement of the class described which is very simple in construction and which is adapted to reach the corn and bring the same into the mechanism of the machine without necessitating the exercise of great care in driving the implement.

Further objects of the invention will appear more fully hereinafter.

Reference is to be had to the accompanying drawings, forming a part of this specification, in which similar characters of reference indicate corresponding parts in all the figures.

Figure 1 is substantially a side elevation of the implement, certain parts being shown in section and broken away. Fig. 2 is a rear elevation of the principal portion of the implement, certain parts being broken away. Fig. 3 is a plan of a portion of the implement, parts of which are broken away and illustrating especially the manner of mounting and driving the husking-rollers. Fig. 3ª is a detail showing the manner of attaching a bracket to the machine. Fig. 4 is a plan illustrating especially the frame construction of the implement and the means for attaching the tongue of the implement. This view also shows some of the driving mechanism. Fig. 4ª is a plan showing a detail of an adjustable connection on the frame. Fig. 4ᵇ is a perspective showing a detail of the construction at the rear of the frame. Fig. 5 is a substantially vertical section taken through the husking-rollers and passing through an ejector and husk-conveyer which are located below the husking-rollers. Fig. 6 is substantially a plan of the ejector shown in Fig. 5, certain parts of the implement being represented as broken away. Fig. 7 is a diagrammatic side elevation illustrating the means by which all the moving parts of the implement are driven. Fig. 8 is substantially a plan of the snapping-table at which the ears are separated from the stalks. The lower portion of this view represents shoes detached from the snapping-table, and these are also indicated in plan. Fig. 9 is a transverse section taken substantially at right angles to the plane of the snapping-table and passing through the same. Fig. 10 is a perspective representing in detail one of the links of the snapping-chains which are used in connection with the snapping-table. Fig. 11 is a cross-section through a portion of the snapping-table, illustrating modified means for mounting or guiding the snapping-chains; and Fig. 12 is a side elevation, upon a somewhat enlarged scale, showing a detail of a connection between the snapping-chains and the feed-chains.

Referring more particularly to the parts, and especially to Figs. 1 and 4, the frame 1 of the implement is of substantially rectangular form, as shown, comprising a substantially horizontal forward cross-beam 2 and a rear tail-beam 3, the said beams being connected by longitudinals 4. Upon the longitudinals 4 suitable bearings 5 are attached, in which the axle 6 of the implement is rotatably mounted. Upon this axle wheels 7 and 8 are mounted, the latter of which constitutes a driving-wheel for the purpose of transmitting movement to the parts of the implement.

Preferably at the left of the implement, as shown in Fig. 4, at the under side of the frame 1, a tongue-beam 9 is attached, and this beam projects forwardly and inclines somewhat inwardly toward the central axis of the implement, as shown. It is preferably secured in this position by a brace 10, the said brace and the said beam 9 being preferably attached to the frame at opposite sides of the driving-wheel 8. At the forward extremity of the beam 9 a fork 11 is pivotally mounted at 12, and this fork carries a pilot-wheel 13, which is adapted to run upon the ground and support the forward portion of the frame.

On its outer side to the extremity of the beam 9 there is attached a bracket 14, the arm of which is provided with a plurality of openings 15, which enable the attachment of a shackle 16. To this shackle 16 attaches the rear extremity of the tongue or pole 17 of the implement. The aforesaid wheel-fork 11 is provided with a bifurcated forwardly-projecting arm 18, to the forward extremity of which a link 19 attaches, the opposite extremity of the said link being attached pivotally at 20 to the rear extremity of the tongue 17, as indicated. This link is provided with a plurality of openings 21, which correspond with the openings 15 and may receive a bolt 22, which attaches the link to the fork 11. This arrangement for attaching the tongue to the beam 9 affords means for adjusting the lateral position of the tongue with respect to the frame, it being understood that in order to effect such an adjustment a bolt 23, which attaches the shackle, could be removed, and the shackle could be moved and attached at another of the openings 15. Likewise the bolt 22 could be removed and the link 19 attached to the fork through another one of the openings 21. The tongue 17 would be of any common construction and would afford means for attaching draft-animals, such as horses, for the purpose of advancing the implement in the field.

Referring now especially to Figs. 1 and 3, at the forward portion of the frame uprights 24, preferably two in number, are provided, and these support elevated beams 25 and 26, which are preferably disposed askew, as indicated, and transversely above the frame. These members 25 and 26 support the rear portion of a snapping-table 27. As indicated most clearly in Fig. 1, this snapping-table is disposed in an inclined position extending upwardly toward the rear. The construction and arrangement of this snapping-table are most clearly indicated in Fig. 8. It comprises a pair of oppositely-disposed decks or snapping-boards 28 and 29. These decks are substantially similar in construction and placed oppositely, their adjacent edges a short distance apart, as indicated. At their upper extremities yokes 30 are provided, which are for the purpose of supporting the snapping-table in a manner which will appear presently. Upon the upper inclined edges of the members 25 and 26 bearings 31 are attached, in which shafts 32 and 33 are rotatably mounted, and these shafts project above the beams 25 and 26 and coöperate with them to support the upper extremities of the yokes 30, which will hang thereupon, as will be readily understood. The shafts 32 and 33 are driven continuously when the implement advances by a mechanism which will be described more fully hereinafter, and for reasons which will appear more fully hereinafter the said shafts are preferably formed with sections 32ª and 33ª. These sections are the portions of the shafts which extend above the beams 25 and 26 in the manner referred to above and are connected with the bodies of the shafts through universal connections 32ᵇ and 33ᵇ. Upon the shaft-sections 32ª and 33ª sprocket-wheels 34 are rigidly mounted, and around these sprocket-wheels snapping-chains 35 pass. At the adjacent lower corners of the decks 28 and 29 smaller sprocket-wheels 36 are provided, to which the lower portions of the chains pass, as indicated. Other sprocket-wheels or tighteners 37 are adjustably mounted in slots 38, and these engage the chains in such manner as to enable the tightness of the same to be adjusted, as will be readily understood. Along the outer edges of the decks 28 and 29 guide-strips 39 are attached longitudinally, between which the chain passes in its downward course. The upper courses 35ª of the chains pass between guide-strips 40 and 41, the latter of which strips at their upper extremities are bent around the peripheries of the sprocket-wheels 34, attaching to the outer edges of the decks, as indicated. From this arrangement the guide-strips 41 constitute guards for the sprocket-wheels. At their upper extremities the guide-strips 40 turn inwardly toward the decks and attach rigidly thereto, as shown. The aforesaid sprocket-wheels 36 are rotatably mounted on studs 42, which project outwardly from guard-plates 43, said guard-plates resting loosely upon the upper surface of the decks 28 and 29, near the lower extremities thereof, and at their inner edges. These guard-plates 43 are preferably substantially circular in form, as indicated, and provided on their outer edges with flanges 44, which constitute guards for the sprocket-wheels. Near their upper edges these guard-plates are suspended freely upon links 45, which are hung pivotally at 46 upon the upper faces of the decks. Both these guard-plates 43 are freely hung upon the links 45, and they are normally constrained toward each other by means of springs 47, the said springs being attached to slide-bars 48, the same being guided transversely of the decks by means of cleats 49, attached to the faces of the decks, as shown. The lower extremities of the aforesaid guide-strips 41 attach at the peripheries of the guard-plates 43 and constitute substantially tangential continuations of the aforesaid flanges 44. The aforesaid guide-strips 40 attach to the plates also, as shown, and with this arrangement the space between the guide-strips constitutes substantially guide-ways for the upper runs 35ª of the snapping-chains. In order to secure the guide-strips 40 and 41 throughout their length, light brackets 50 are provided, which attach at the adjacent edges of the decks 28 and 29 and project into the space therebetween. The projecting portions of these brackets are formed with upwardly-disposed forks 51, which attach to the guide-strips rigidly in any suitable manner. As indicated most clearly in Fig. 8, these brackets are preferably disposed in an alternating or staggered relation, so that the brackets attached to one of the decks will lie intermediate of the brackets attached to the opposite deck. The purpose of this arrangement will appear more fully hereinafter.

In Fig. 11 is illustrated a modified construction by means of which the brackets 50 may be resiliently attached to the decks. With this arrangement the bodies of the brackets constitute slides guided under cleats 52, each of said brackets having an upwardly-turned tail 53, through which an eyebolt 54 passes, the said eyebolt serving to attach a spring 55, which is connected to the deck near the inner edge thereof and operates to return the guide-strips to their normal positon if they are forced inwardly.

In Fig. 10 is illustrated one of the links of the snapping-chains. The bodies 56 of all these links are of substantially the same form, presenting wrists 57 at one side and hooks 58 at the opposite side, so that the links may be assembled into a complete chain. The links are preferably all formed at their upper portion into integral flat plates 59, and at the rear edge of each plate 59 a flange 60 is provided, which projects upwardly and substantially at right angles to the plane of the plate. These flanges and their relation to the chain are very clearly illustrated in Fig. 1. At suitable intervals the flanges are formed of enlarged or extended form, like the flange 61. (Shown in Fig. 10.) The purpose of these special links with these extended flanges will appear more fully hereinafter.

Arrangement is made for adjusting the distance between the adjacent edges of the decks 28 and 29. To this end beneath the snapping-table a truss 62 is provided, the same consisting of arms 63, attaching, respectively, to the under faces of the decks, and these arms are held apart by a strut 64. The strut 64 is preferably given a short taper or point 65 at its extremities, and these points are received in corresponding recesses formed in the adjacent faces of the arms 63. On opposite sides of the strut 64 tie-bolts 66 are provided, which connect the arms 63 and enable the distance between the decks to be adjusted by means of nuts 67, carried by the bolts. In this connection it should be understood that if one bolt should be tightened and the opposite bolt loosened the arms 63 would be adjusted upon the points 65 as fulcrums.

The arms 63 are connected by braces 27ᵇ with the rear side of the decks 28 and 29, as shown. At the lower portion of the snapping-table a pair of braces 68 and 69 are provided, the same being attached, by means of expanded feet 70, to the rear side of the snapping-table 27. These braces are most clearly shown in Figs. 1 and 4. They are connected with the decks 28 and 29 by braces 27ᵃ and extend rearwardly, as shown. A brace 68 connects with the tail-beam 3 of the frame by a simple pivotal connection 71. The brace 69 is formed with a slot 69ᵃ, through which passes an eyebolt 72, and its extremity is offset laterally and mounted upon an adjusting-screw 73, as indicated most clearly in Fig. 4ᵃ. By reason of this adjustment the position of the snapping-table may be altered with respect to the central line of the implement. For a purpose which will appear more fully hereinafter near their forward portions the braces 68 and 69 are offset outwardly, as at 74, so as to inclose a rudimentary opening 75.

Referring now to Figs. 1 and 8, to the forward lower edges of the decks 28 and 29 oppositely-disposed shoes 76 are attached, preferably by means of hinges 77. These shoes are preferably of substantially the form shown, having bodies disposed substantially in the same direction as the decks 28 and 29 and diverging noses 78, said noses being preferably rounded, as indicated. These shoes normally occupy substantially a horizontal position and are secured by means of diagonal braces 79, which braces are attached to the upper sides of the decks by means of suitable bolts located at 80. In order to enable the position of the shoes to be adjusted within certain limits, the upper extremities of the diagonal braces 79 are preferably formed with slots 81, which receive the bolts at 80, as will be readily understood. Upon the upper side of the shoes 76 feed-chains 82 are provided, which operate to advance the stalks of corn into the space between the shoes and toward the space between the decks. In this connection it should be observed that the said shoes are disposed apart so that the adjacent edges of their bodies are substantially in alinement with the inner edges of the decks. To the upper sides of the bodies of the shoes 76 inclined plates 83 are attached, which are elevated toward the rear, and to the upper faces of these plates brackets 84 are attached, the said brackets being offset upwardly and carrying rotatably sprocket-wheels 85. These sprocket-wheels are driven continuously by universal connections 86, which lead from the aforesaid sprocket-wheels 36. This universal connection is of any common construction, such as that indicated in Fig. 12. The inner courses 87 of the chains 82 of course move upwardly, and the chains are provided with outwardly-projecting dogs 88, which preferably curve rearwardly, as shown. These dogs are disposed upon the chain so that they advance substantially opposite to each other and when the chains are in motion operate of course to feed the stalks rearwardly in the direction of the snapping-table. In order to prevent any possibility of the stalks of corn being carried around the sprocket-wheels 85 with the chains, guard-springs 89 are provided, which attach to the inner edges of the shoes, as indicated, and the bodies of these springs are preferably curved inwardly, converging, as shown, so as to present a narrow opening through which the stalks must pass to go into the space between the decks. The inner courses 87 of the chains are guided by means of sprocket-wheels 90 91, so that the dogs 88 may pass around the inner edges of the shoes, as shown, projecting beyond the same, so as to facilitate the feeding movement. At the inner edges of the shoes guard-strips 92 are provided which assist in guiding the chains. While the lower portions of the courses 87 of the chains are disposed substantially horizontally, lying upon the upper faces of the shoes, the rear portions beyond the sprocket-wheels 90 incline upwardly, so as to pass over the sprocket-wheels 85, which are slightly elevated, as indicated.

From the construction described above it should be evident that as the implement is advanced in the standing corn the stalks of corn may pass into the converging space between the noses 78, whereupon the continuous movement of the chains 82 will operate to advance the stalks rearwardly toward the snapping-table. After this movement has sufficiently progressed the snapping-chains will operate to pull off the ears from the stalks. This result is accomplished because the space between the inner edges of the snapping-chains 35 is too small to allow the ears to pass. The detached ears are then caught by the wings or flanges 61 aforesaid and advanced upwardly toward the husking mechanism, which will be presently described.

The manner of mounting the snapping-table by hanging the same upon the yokes 30 in the manner fully described above very materially facilitates the entrance of the stalks into the space between the decks. In this connection it should be understood that when the stalk strikes upon the inclined inner edge of either of the noses 78 it is not necessary that the stalk should be bent from its course when the direction of the implement changes in order to effect its passage into the space between the decks. This follows because the snapping-table moves freely either to the right or to the left upon the yokes 30. In this way the snapping-table adjusts itself automatically, as it were, to the position of the stalk. This arrangement for mounting the snapping-table is considered highly advantageous, as it obviates any necessity for carefully driving the implement and enables the machine to adapt itself readily to the cornstalks which are not in true alinement with the row in which they stand or which may have had their bodies forced to one side by the wind.

The husking mechanism will now be described. This mechanism comprises a pair of oppositely-disposed cylinders or rolls 93. (Illustrated most clearly in Figs. 1, 3, and 5.) They are disposed in the same general direction as the decks 28 and 29 and are mounted in an inclined position just to the rear of the decks, as shown. They are located close together, so that their surfaces substantially roll upon each other, and the line of contact between the cylinders or rolls is substantially in alinement with the center of the space between the decks 28 and 29. The forward and upper extremities of these rolls are formed into tapered snouts 94, which are rotatably mounted upon gudgeons carried in brackets 95 96, the said brackets being attached, respectively, to the aforesaid beams 25 and 26. The roll 93$^a$, which is located to the right of the implement as viewed in Fig. 3, constitutes the main husking-roller. Its shaft 97 is rotatably mounted in a bearing 98, which bearing is rigidly secured to the upper face of a transversely-disposed husking-beam 99, which beam is supported upon the frame of the implement in any suitable manner. Near their lower extremities the husking-rolls 93 are provided with gear-wheels 100 101, which mesh together in order that the rotation of the main husking-roll 93$^a$ will be imparted to the roll 93$^b$. The gear-wheel 101 meshes on its outer side with a gear-wheel 102, which latter is carried rigidly by the lower portion of the aforesaid sectional shaft 33. By reason of this arrangement the rotary movement of the husking-roll 93$^a$ is imparted to the snapping-chain, which is carried upon the deck 29. A similar gear-wheel 103 is provided, which is attached to the sectional shaft 32, and this gear-wheel meshes with the gear-wheel 100, so that the snapping-chain carried upon the deck 28 is continuously driven with the rolls. The lower extremity of the shaft 33 is rotatably mounted in a suitable bearing 104, which, like the bearing 98, is rigidly attached to the husking-beam 99. The trunnions of the husking-roll 93$^b$ and of the shaft 32 are mounted in bearings 105, which are formed upon a floating bracket 106, the said bracket being mounted so as to move freely upon pivoted links 107, the lower extremities of which links are freely attached to the face of the husking-beam 99. A spring 108, which is attached to the bracket 106, has its opposite end connected with the beam 99, and this spring operates normally to maintain the face of the roll 93$^b$ against the roll 93$^a$. Means are also provided at the upper extremity of the roll 93$^b$ for constraining it toward the roll 93$^a$. For this purpose the bracket 95, referred to above, is guided through cleats 109, attached to the beam 25, the outer extremity of said bracket being attached to a spring 110, carried by the beam, which spring operates to force the roll 93$^b$ toward the roll 93$^a$, as will be readily understood.

The rolls 93 consist of hollow cylinders, as shown in Fig. 5. The face of the roll 93$^a$ is provided with a plurality of longitudinally-disposed ribs 111, which ribs are preferably three in number and disposed at equal distances apart, as indicated. At or near its extremities annular shoulders or rings 112 are formed, the outer faces of which roll upon the opposing face of the roll 93$^b$. From this arrangement there normally exists a space between the faces of the rolls, and through this space at regular intervals the ribs 111 pass. Adjacent to one of the ribs 111 a stripper 113 is attached, and this stripper consists of an elongated flat bar, at the forward edge of which upwardly-inclined teeth 114 are provided. This stripper 113 is attached just in advance of one of the ribs 111 and operates to remove the husk of an ear lying in the space between the rolls. Strippers 115, similar to the stripper 113 aforesaid, are attached to the face of the roll 93$^b$, and these are disposed in such position that as the rolls rotate they pass the point of contact between the rolls at points intermediate between the ribs 111. From this arrangement as the rolls rotate the intermediate or depressed faces 116 of the roll 93$^a$ come successively into the paths of the strippers 115, carried by the roll 93$^b$. The relation of the rolls in this respect is maintained, of course, by reason of the fact that the gear-wheels 100 101, which they carry, are of equal diameter.

As indicated most clearly in Fig. 5, inclined guard-boards 117 are provided, located, respectively, at each side of the rolls with their lower edges adjacent to the faces of the rolls, as indicated. It should be understood that the rolls rotate toward each other above in such a manner as to pass the husks downwardly between them.

In order to dispose of the pieces of husk which tend to accumulate in the space above the rolls, a husk-feed 118 is provided. This husk-feed is most clearly illustrated in Figs. 1 and 2, and its construction comprises a body or board 119, placed in an inclined position above the lower or rear portions of the husking-rolls, and it is disposed in a substantially vertical plane. At its lower extremity the body or board 119 is provided with oppositely-disposed forked brackets 120, the forks of which are supported upon a transverse shaft 121, as indicated most clearly in Fig. 2. This shaft 121 is mounted upon a rudimentary Z-bar 122, the body of which attaches to the upper face of one of the inclined guard-boards 117, and to the arms of this Z-bar brackets 123 are attached, the same being provided with bearings for the shaft, as illustrated.

To the shaft 121 a sprocket-wheel 124 is attached, which sprocket-wheel affords means for driving the shaft continuously as the implement advances. This manner of driving will be described more fully hereinafter. To one extremity of the shaft 121 a second sprocket-wheel 125 is attached, and this sprocket-wheel is in substantial alinement with the body-board 119 and is disposed in alinement with a corresponding sprocket-wheel 126, which latter sprocket-wheel is located at the upper extremity of the body-board, as indicated. Preferably arrangement should be made for adjusting the distance between these sprocket-wheels. To this end the sprocket-wheel 126 is preferably mounted upon a bracket 127, having a slot 128, by means of which adjusting-bolts 129 attach the bracket to the body. Over the sprocket-wheels 125 and 126 a sprocket-chain 130 passes. When the machine is advancing, the lower course 131 of this chain is moved upwardly so as to oppose the natural gravitation of the ears and husks toward the lower portion of the husking-rolls. To the chain 130 a plurality of outwardly-projecting horns 132 are attached, and the bodies of these horns preferably curve rearwardly with respect to the direction of advance of the chain, so that the tips of the horns, which are substantially straight, dispose themselves substantially parallel with the axes of the husking-rolls as they advance with the lower course 131 of the chain. The extremities of most of these horns are preferably plain and simply pointed, but certain of the horns, preferably every third horn, is provided with an outwardly-turned tip forming a serrated hook 133. This husk-feed is for the purpose of initiating the separation of the husks from the ears and from the shelled grain which passes through the husking-rolls. In this connection it should be understood that as the horns 132 move upwardly they operate to advance the husks with which they come in contact in an upward direction along the rolls, from which arrangement there is a tendency for the principal portion of the husk to pass through the rolls near the upper portion thereof while the ears of corn gravitate toward the lower extremity thereof and are discharged and disposed of in a manner which will be described more fully hereinafter.

In order to stir the ears of corn as they lie upon the rolls at suitable intervals, the chain 130 is provided with stirrers or stems 134, which project downwardly at the lower course of the chain and disturb the ears as the stems pass upwardly. At the lower extremity of the husk-feed a shield 135 is provided, which shield consists of a bent plate which conforms substantially to the outline of the path of the points of the horns 132, operating as a guard for them, as will be readily understood.

Arrangement is made for adjusting the head of the husk-feed in its relation to the rolls 93. For this purpose the body-board 119 is mounted upon inwardly-bent standards 136, as indicated in Fig. 2, the said standards being attached oppositely and comprising bolt-and-slot connections 137. Evidently the slots enable the head or the upper portion of the husking device to be readily adjusted.

Below the husking-rolls a separator 138 is provided, and this consists of a body, preferably constructed of wood, having a rearwardly-inclining bottom 139 and sides or side boards 140, which are disposed substantially vertically, as shown. Between the sides 140 a pair of sprocket-rollers 141 and 142 are rotatably mounted, the same being respectively located at opposite extremities of the separator. The roller 142 is carried upon brackets 143, which have slots 144, through which bolts pass, as will be readily understood, for the purpose of enabling the position of this roller to be adjusted. Over the rollers 141 142 a conveyer-belt 145 passes, and this belt comprises oppositely-disposed sprocket-chains connected by transverse slats 146, the said slats being disposed apart, so as to present spaces through which the shelled grain may pass. At suitable intervals the slats are provided with upwardly-projecting pins 147, which pins operate to advance the husks toward the upper or forward portion of the separator. In this connection it should be understood that the upper course of the conveyer-belt 145 moves forwardly and in the direction in which the implement advances, it being also understood that the conveyer-belt is continuously driven while the implement moves. The mechanism for driving this belt will be described more fully hereinafter.

The lower edge of the separator-bottom 139 is disposed just above a receiver 148, into which the shelled grain is ejected from the separator by the pins 147. At this edge a guard 149 is provided, which is of curved form, as shown in Fig. 2, and comprises a plurality of upwardly-disposed curved blades presenting openings 150 therebetween. This guard is for the purpose of preventing small pieces of husk from passing into the receiver, should any such pieces find their way to this point of the separator. The pins 147 are disposed upon the slats 146 in such arrangement that the pins pass into the aforesaid spaces 150, and in this manner they operate to clear the guard of any pieces of husk that may tend to adhere thereto and clog the same.

The body of the separator is located in a suitable position beneath the rolls 93, so that all grain and husks that pass between the rolls will fall upon the upper course of the conveyer-belt. The shelled grain will of course find its way through the spaces between the slats and eventually fall upon the inclined bottom 139. The husks, however, or the principal portion thereof will be advanced upwardly and ejected at the upper portion of the separator, passing between the arms 63 aforesaid and through the rudimentary opening 75, formed between the braces 68 and 69. The adjustment of the roller 142 evidently enables the tension of the conveyer-belt to be readily adjusted.

Though the conveyer-belt operates to eject the principal portion of the husks at its upper extremity, some pieces of husk find their way through the same and are carried rearwardly upon the lower course of the conveyer-belt. Arrangement is made for ejecting such pieces of husk near the rear portion of the separator. To this end there is provided an ejector 151, the construction of which is most clearly shown in Figs. 5 and 6. It consists of a plate of substantially rectangular form, the rear portion of which is formed into a sleeve 152, surrounding the axle 153 of the sprocket-wheel 141. At its forward edge this plate is supported upon a transverse bolt 154, and at one edge it is formed with a projecting wing 155, which wing is composed of a plurality of prongs or tines 156, the axes whereof are disposed laterally with respect to the direction in which the conveyer-belt advances. This ejector operates as a guard to prevent small pieces of husk from wrapping around the axle 153 and also operates to eject the husk as the same advances upon the plate. To this end an opening 157 is provided through the adjacent side and through which the pieces of husk may find exit. The tines 156 operate advantageously to support the husk, while they allow the grain to fall between them if there should be any with the husk, the said grain then passing to the inclined bottom 139.

The receiver 148 constitutes an inlet to an elevator 158, within the body of which a chain or belt conveyer 159 operates continuously, the same being driven from a shaft 160 and running over the sprocket-wheels 161 and 162. To the chain 159 a plurality of wings 163 are attached, and these wings at suitable intervals are replaced by cups 164. The wings will operate to elevate the ears of corn which drop into the receiver, and the cups 164 pick up the shelled grain which accumulates at the bottom of the elevator, raising the same, as will be readily understood. At the upper extremity of the elevator a substantially vertical board 165 is provided, which constitutes a guide for deflecting the shelled grain vertically downward into a wagon, which would be driven at the side of the implement.

Arrangement is made for tightening the chain 159. To this end the upper sprocket-wheel 162 is mounted upon a shaft 166, carried in a slot 167, said shaft being rotatably mounted in a bracket 168. This bracket has a longitudinally-disposed slot 169, through which it is attached to the body of the elevator by suitable bolts, and the bracket is adjustable longitudinally by means of an adjusting-screw 170.

The arrangement for driving the moving parts of the implement will now be described, referring especially to Figs. 1, 3, 4, and 7. By means of a main sprocket-wheel 171, which is rigidly mounted upon the axle 6 of the implement, an auxiliary axle 172 may be driven through the medium of a sprocket-chain 173. The connection between the sprocket-chain 173 and the axle 172 includes a clutch 174, which is normally held closed by a spring 175, as shown in Fig. 3, but which may be opened at will through the medium of a bell-crank lever 176, which attaches to a controlling-lever 177 by means of a link 178. The said lever 177 is preferably mounted forwardly upon the member 25 and should be located in a convenient position with respect to the seat 179, upon which the driver sits. An auxiliary chain 180 is driven from an intermediate point, as at the sprocket-wheel 186, upon the auxiliary shaft 172. As indicated most clearly in Fig. 7, this chain passes over an elevated guide sprocket-wheel 181, from which wheel the chain passes downwardly and over the aforesaid sprocket-wheel 124, which was described in connection with the husk-feeder. This guide sprocket-wheel 181 is preferably mounted upon a pivoted arm 182, which is held firmly in position by an adjustable diagonal brace 183, the said arm and said brace being attached to the adjacent guard-board 117. Continuing downwardly below the sprocket-wheel 124 the chain passes over a sprocket-wheel 184, which is carried rigidly by the axle of the sprocket-roller 141. Below this point the auxiliary chain 180 passes to a guide sprocket-wheel 185, returning to the auxiliary axle, where it passes over a sprocket-wheel 186, carried by the same. Through the medium of bevel-gears 187 and the sprocket-wheel 185, which are rigid on a stub-shaft 185$^a$, the axle is driven, and this actuates the elevator-chain 159, as shown most clearly in Figs. 1 and 2. The aforesaid shaft 97 of the main husking-roll 93$^a$ extends below its bearing 188, as indicated in Fig. 3, and carries rigidly a bevel gear-wheel 189, which is driven from a second bevel gear-wheel 190, the latter of which is rigidly mounted upon the aforesaid auxiliary shaft 172. In order to enable the husking-rolls to be turned by hand when the clutch 174 is disconnected, said shaft 97 is provided with a suitable hand-wheel 191.

In order to prevent ears of corn from being caught between gears 100 and 101, we provide a Y-shaped guard 100$^a$, which is attached to the husking-beam 99 and the same having branches 100$^b$, which lie over the faces of the gears, as will be readily understood.

Arrangement is provided for raising and lowering the frame at its forward portion, so as to give the same the most advantageous adjustment. For this purpose a hand-lever 192 is provided, as indicated in Fig. 1, the same being pivoted to the forward portion of the frame at 193. This lever constitutes a bell-crank lever, the short arm whereof attaches to a link 194, which link is pivotally secured to a mounting 195, rigidly carried by the tongue-beam 9. In connection with the hand-lever 192 a suitable segment 196 is provided, which enables the lever to be locked in any position desired.

The face of the driving-wheel 8 is provided with a plurality of laterally-disposed ribs or lugs 197, and these are supplemented by pointed dogs 198, disposed intermediate thereof, the said dogs being preferably removably attached. These dogs are intended especially to be used where the implement must pass over frozen ground, which may be covered with ice or snow.

The mode of operation of the implement will now be described, it being understood that the implement would be advanced in the standing corn so that the stalks of corn could pass into the converging space between the noses 78. It then follows that by reason of the fact that the snapping-table 27 is hung upon the yokes 30 the said snapping-table will then readily adapt itself to the position of the stalk. The low position of the shoes 76 operates advantageously so as to facilitate the raising of cornstalks that may have been forced down upon the ground. As the implement advances, the stalks come under the influence of the dogs 88, and they operate to advance the stalks rearwardly, eventually passing the same between the guide-springs 89 and into the space between the decks 28 and 29. As the movement of the implement progresses the ears carried by the stalks will finally come into contact with the snapping-chains 35, and these operate to detach the ears, allowing the stalks to pass downwardly between the decks. In this connection attention is called to the staggered relation of the brackets 50, which was mentioned in connection with the means for mounting the guide-strips 40 and 41. By reason of this staggered relation if it should happen that an ear of corn or other object becomes lodged between the chains the same could be readily dislodged by forcing one or the other of the chains outwardly and away from the other. This freedom of movement of the chains laterally is much enhanced by this arrangement; but this would be otherwise if the brackets were located oppositely, for in this event should an ear of corn become lodged at the brackets there would be no possible movement whatever at this point. For this reason the modified construction shown in Fig. 11 is suggested, and when this construction is adopted the staggered relation will not be so necessary. After the ears are detached from the stalks they will be caught by the wings 61 of the snapping-chain and will advance upwardly therewith, passing eventually over the upper extremity of the snapping-table. They fall upon the upper portions of the husking-rolls and proceed downwardly by gravity, at the same time being subjected to the husking action of the husking strips or strippers 113 and 115. If any of the grain is shelled by the strippers or by the ribs 111, this grain passes through to the separator, while the ears with the body of the grain thereupon pass toward the lower portion of the rolls and eventually drop into the receiver 148 at the bottom of the elevator. As the ears progress toward the lower portion of the husking-rolls the horns 132 operate in the manner described to prevent the passing of the husks with the ears, the said husks being automatically fed upwardly, so that they will eventually pass through between the rolls in the vicinity of the upper ends thereof. The mode of operation of the separator has been described very fully hereinbefore, and it need only be stated at this point that the husks or body thereof are ejected at the forward portion, while the grain which passes between the slats of the separator-belt gravitates rearwardly upon the inclined bottom 139 and drops in due course into the receiver.

Special attention is called to the arrangement for mounting the husking-rolls, consisting, as it does, in supporting them on separated parts of the frame, so that a space is presented between them, into which uprooted stalks may pass, and the fact that the forward or receiving extremity of these rolls is elevated operates beneficially in preventing the roots of uprooted stalks from passing against the rolls. If that occurred, it would have a tendency to clog them and detract from their efficiency.

Having thus described our invention, we claim as new and desire to secure by Letters Patent—

1. In an implement of the class described, in combination, a frame, a snapping-table mounted upon said frame and inclining upwardly toward the rear, means for freely supporting said snapping-table at the upper portion thereof, and yielding braces attached to said frame toward the rear and connecting with said snapping-table at the forward extremity thereof.

2. In an implement of the class described, a snapping-table comprising a pair of oppositely-disposed inclined decks elevated toward the rear, a pair of oppositely-disposed shoes making hinge connection with said decks at the forward edges thereof, said shoes being disposed substantially horizontally before said decks, and braces attached to the upper faces of said shoes and having their upper extremities adjustably attached to said decks.

3. In an implement of the class described, a snapping-table comprising a pair of oppositely-disposed inclined decks elevated toward the rear and presenting a space therebetween, guides mounted in said space, brackets attached to said decks and supporting said guides, the brackets attaching to one of said decks being staggered with relation to the brackets attaching to the opposite deck, chains lying in said guides, and means for driving said chains.

4. In an implement of the class described, a snapping-table comprising a pair of oppositely-disposed inclined decks elevated toward the rear and presenting a space therebetween, sprocket-wheels at the lower portions of said decks, means for yieldingly supporting said sprocket-wheels upon said decks, chains passing around said sprocket-wheels, means for guiding said chains in the space between said decks, and means for continuously driving said chains.

5. In an implement of the class described, a snapping-table comprising a pair of oppositely-disposed inclined decks elevated toward the rear and presenting a space therebetween, sprocket-wheels at the lower portions of said decks, means for yieldingly supporting said sprocket-wheels, means for constraining said sprocket-wheels in the direction of the space between said decks, chains passing around said sprocket-wheels, means for guiding said chains in substantially parallel courses lying in said space, and means for driving said chains.

6. In an implement of the class described, in combination, a pair of oppositely-disposed inclined decks presenting a space therebetween and elevated toward the rear, sprocket-wheels, means for yieldingly mounting said sprocket-wheels near the lower forward edges of said decks, snapping-chains passing around said sprocket-wheels, means for guiding said chains through said space, shoes carried forwardly with respect to said decks and adapted to deflect stalks into said space, sprocket-wheels carried near the rear edges of said shoes, means for driving said second sprocket-wheels from said first sprocket-wheels, feed-chains passing over said second sprocket-wheels, and means for guiding said feed-chains along the adjacent edges of said shoes.

7. In an implement of the class described, in combination, a pair of oppositely-disposed inclined decks elevated toward the rear and presenting a space therebetween, guard-plates yieldingly mounted upon the upper surface of said decks near the forward lower edges thereof, sprocket-wheels carried upon said guard-plates, snapping-chains passing around said sprocket-wheels, means for guiding said chains in said space, shoes attached to the forward edges of said decks, sprocket-wheels mounted near the rear edges of said shoes, universal connections between said first sprocket-wheels and said second sprocket-wheels, feed-chains passing around said second sprocket-wheels, and means for guiding said feed-chains along the inner edges of said shoes.

8. In an implement of the class described, in combination, a pair of oppositely-disposed inclined decks elevated toward the rear and presenting a space therebetween, a pair of guard-plates resting upon the upper surface of said decks near the lower forward edges thereof, links attached to said decks and suspending said guard-plates, sprocket-wheels rotatably mounted upon said guard-plates, snapping-chains passing over said sprocket-wheels, means for guiding said snapping-chains through said space, means for constraining said guard-plates inwardly toward said space, shoes attached to the forward edges of said decks, sprocket-wheels mounted upon said shoes near the rear edges thereof, universal connections between said last sprocket-wheels and said first sprocket-wheels, feed-chains passing about said last sprocket-wheels, and means for guiding said feed-chains along the inner edges of said shoes.

9. In an implement of the class described, a snapping-table having a pair of oppositely-disposed decks, arms attached to said decks and projecting downwardly therefrom, a strut separating said arms and upon which said arms may rock, and adjusting-bolts disposed on opposite sides of said strut.

10. In an implement of the class described, in combination, a pair of oppositely-disposed decks presenting a space therebetween, means for detaching ears from stalks passing through said space, arms attached to the under faces of said decks, a strut separating said arms, and adjusting-bolts connecting said arms on opposite sides of said strut.

11. In an implement of the class described, in combination, a frame, a snapping-table carried thereby and presenting a space into which stalks may pass, a brace pivotally attached at the rear and attached forwardly to said snapping-table, a second brace having a pivotal connection at the rear and also attached to said snapping-table forwardly, and means for adjusting said second brace at said last pivotal connection.

In testimony whereof we have signed our names to this specification in the presence of two subscribing witnesses.

THEODORE A. OVERBY.
JOHN G. OVERBY.

Witnesses:
DANIEL GIBSON
JOHN O. OVERBY.